(12) United States Patent
Matsumoto et al.

(10) Patent No.: US 6,391,124 B1
(45) Date of Patent: May 21, 2002

(54) NON-HEAT TREATED, SOFT-NITRIDED STEEL PARTS

(75) Inventors: Hitoshi Matsumoto; Yoshihiko Kamada; Mitsuo Uno, all of Kitakyushu; Masato Kurita, Amagasaki; Seiichi Koike; Mitsuo Takashima, both of Wako, all of (JP)

(73) Assignees: Sumitomo Metals (Kokura) Ltd., Kitakyushu; Honda Giken Kogyo Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/698,266

(22) Filed: Oct. 30, 2000

(30) Foreign Application Priority Data

Nov. 5, 1999 (JP) ............................. 11-315936

(51) Int. Cl.$^7$ ................................. C23C 8/26
(52) U.S. Cl. ..................... 148/318; 148/230; 420/126
(58) Field of Search .................. 148/318, 230, 148/320; 420/126

(56) References Cited

U.S. PATENT DOCUMENTS 5,985,044 A * 11/1999 Kurita ..................... 148/226

FOREIGN PATENT DOCUMENTS

| JP | 59016949 A | 5/1984 |
|----|------------|--------|
| JP | 01177338 A | 10/1989 |
| JP | 08170146 A | 11/1996 |
| JP | 09003601 A | 1/1997 |
| JP | 09291339 A | 11/1997 |
| JP | 09324258 A | 12/1997 |
| JP | 10046287 A | 2/1998 |
| JP | 1129838 | * 2/1999 |
| JP | 11062943 A | 3/1999 |
| JP | 20008141 | * 1/2000 |
| JP | 2000309846 | * 11/2000 |

* cited by examiner

*Primary Examiner*—Roy King
*Assistant Examiner*—Andrew Wessman
(74) *Attorney, Agent, or Firm*—Burns, Doane, Swecker & Mathis, LLP

(57) ABSTRACT

A non-heat treated soft-nitrided steel part respective contents of C, Si, Mn, P, Cr, Ti, V, N, Al, Pb, S and Ca of which are in specific ranges and which satisfies the following formulas (1) to (3). This part can be produced in a process of hot working, machining and soft-nitriding without any prior heat treatment, and has superior properties such as high fatigue strength and wear resistance.

$$Fn1=-141.5(C\%)-19.6(Mn\%)+1280(N\%)+95.6\leq 60 \quad (1)$$
$$Fn2=-103.8(C\%)+59.1(Mn\%)+850.4(N\%)+360.9\geq 350 \quad (2)$$
$$Fn3=-13.4(C\%)-3.45(Mn\%)+112.7(N\%)+13.2\geq 7 \quad (3)$$

4 Claims, 8 Drawing Sheets

[Fig. 1]
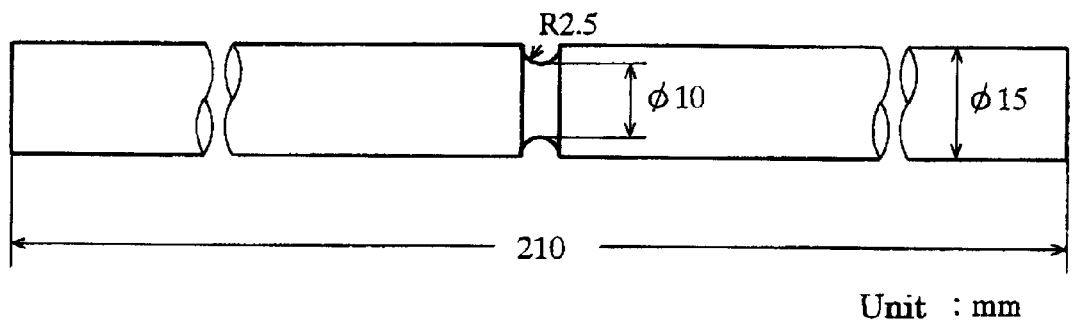
[Fig. 2]
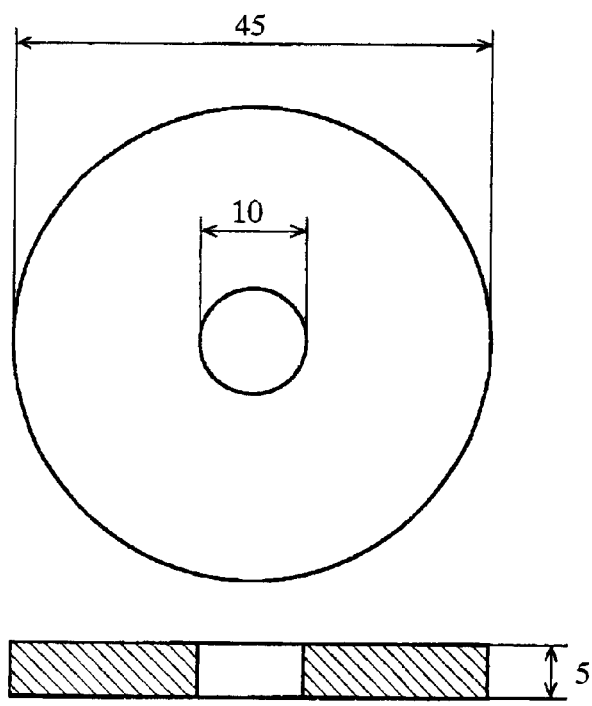

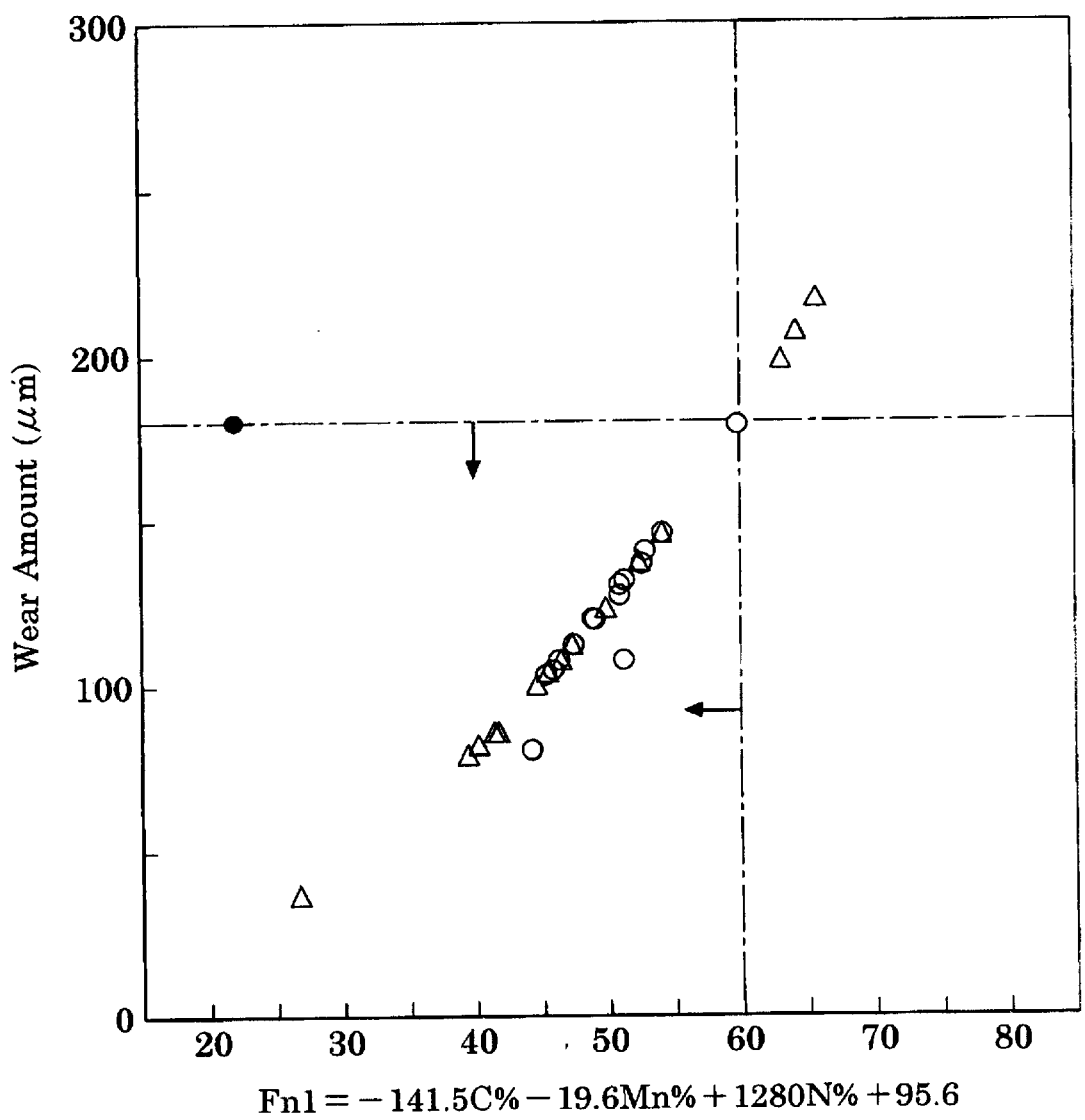
[Fig.3]

[Fig.4]
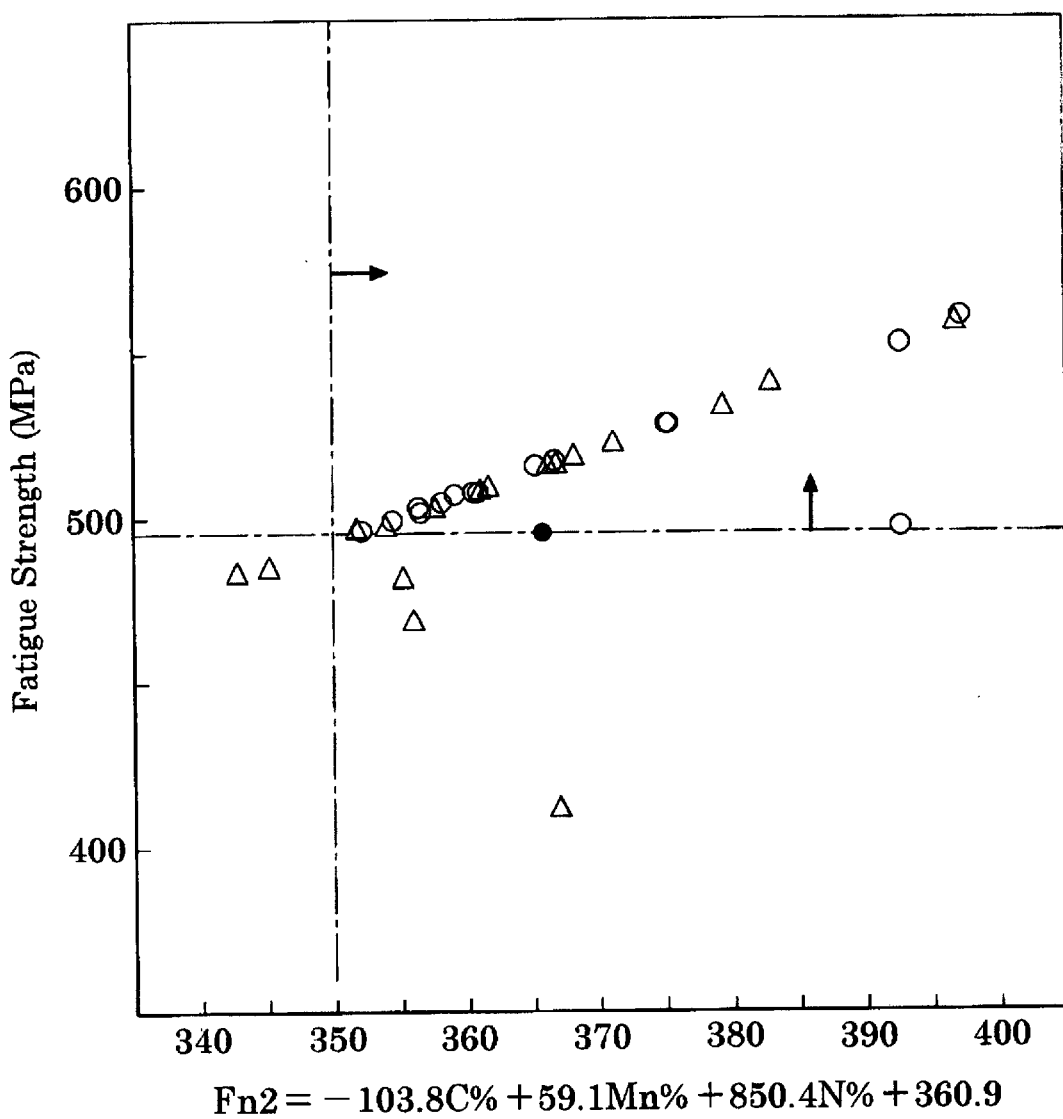
Fn2 = −103.8C% + 59.1Mn% + 850.4N% + 360.9

[Fig.5]
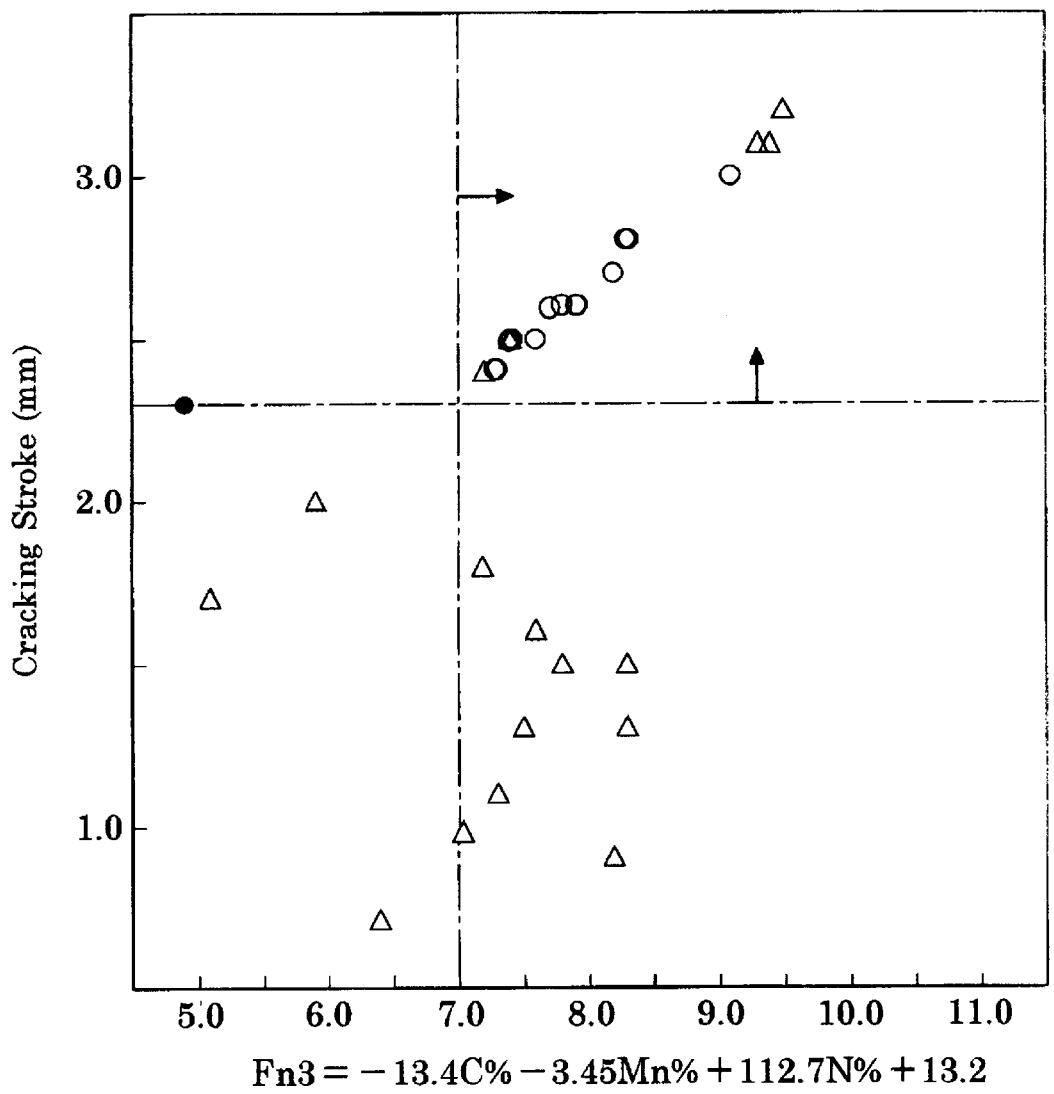

[Fig.6]
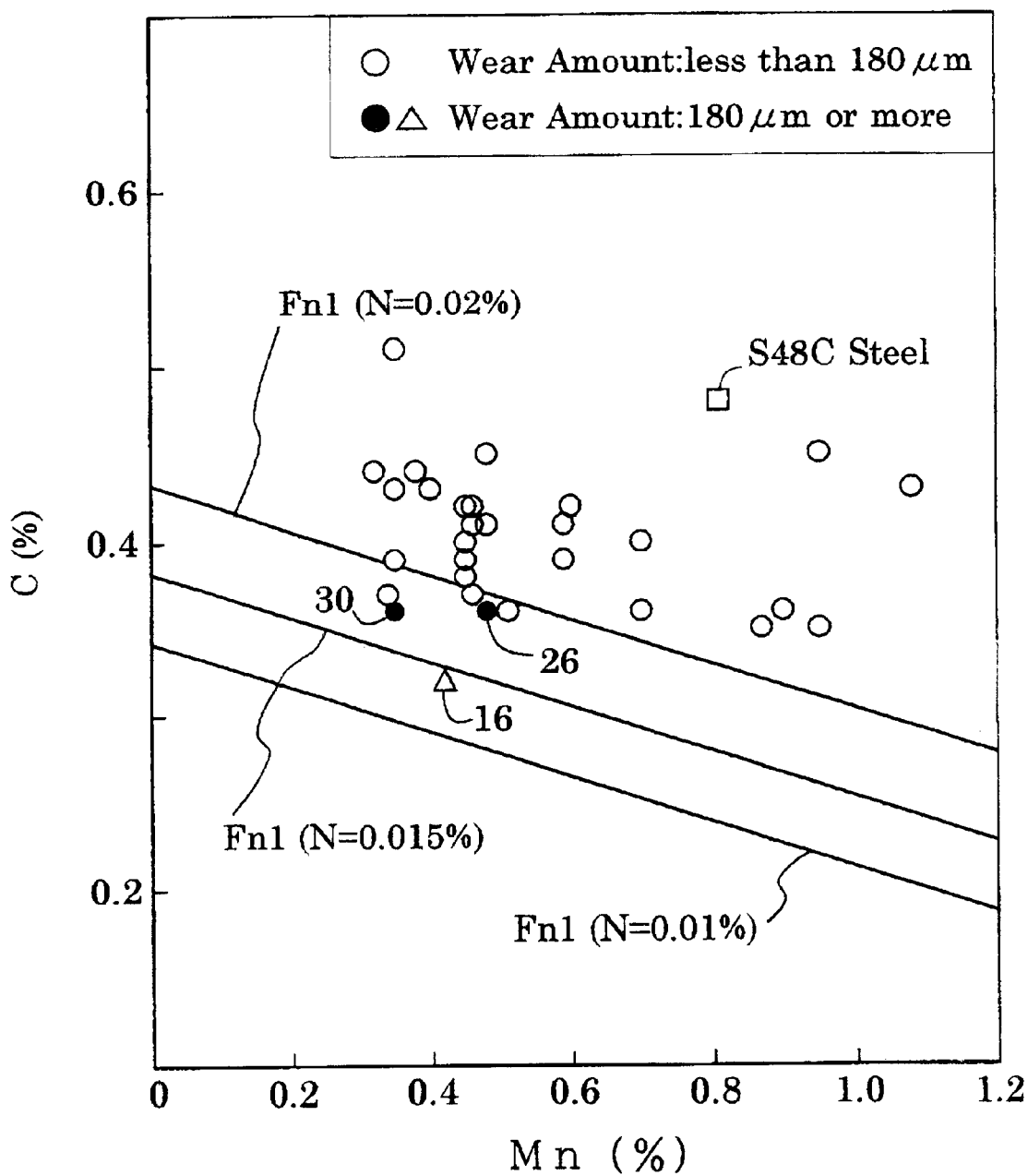

[Fig.7]
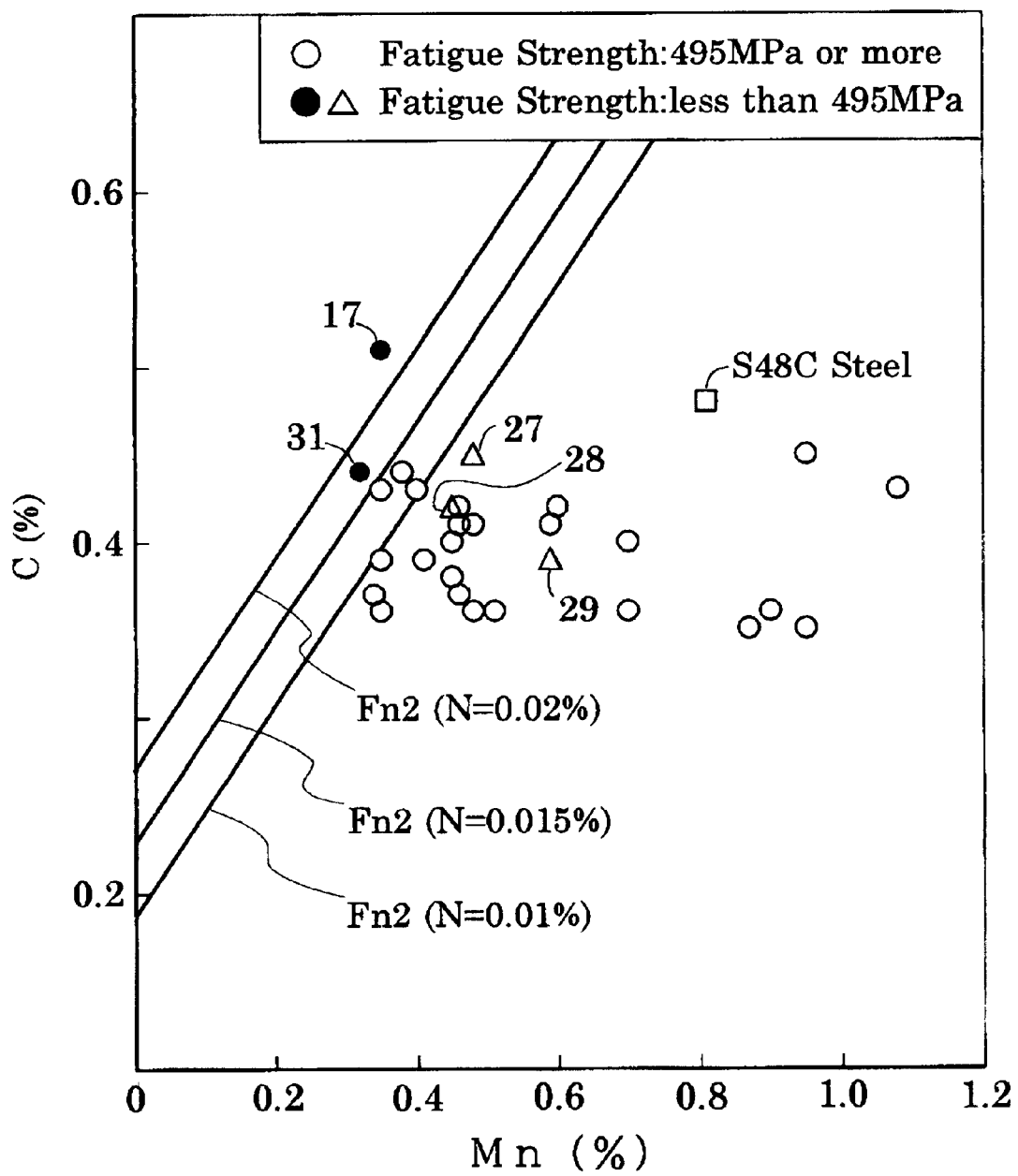

[Fig.8]
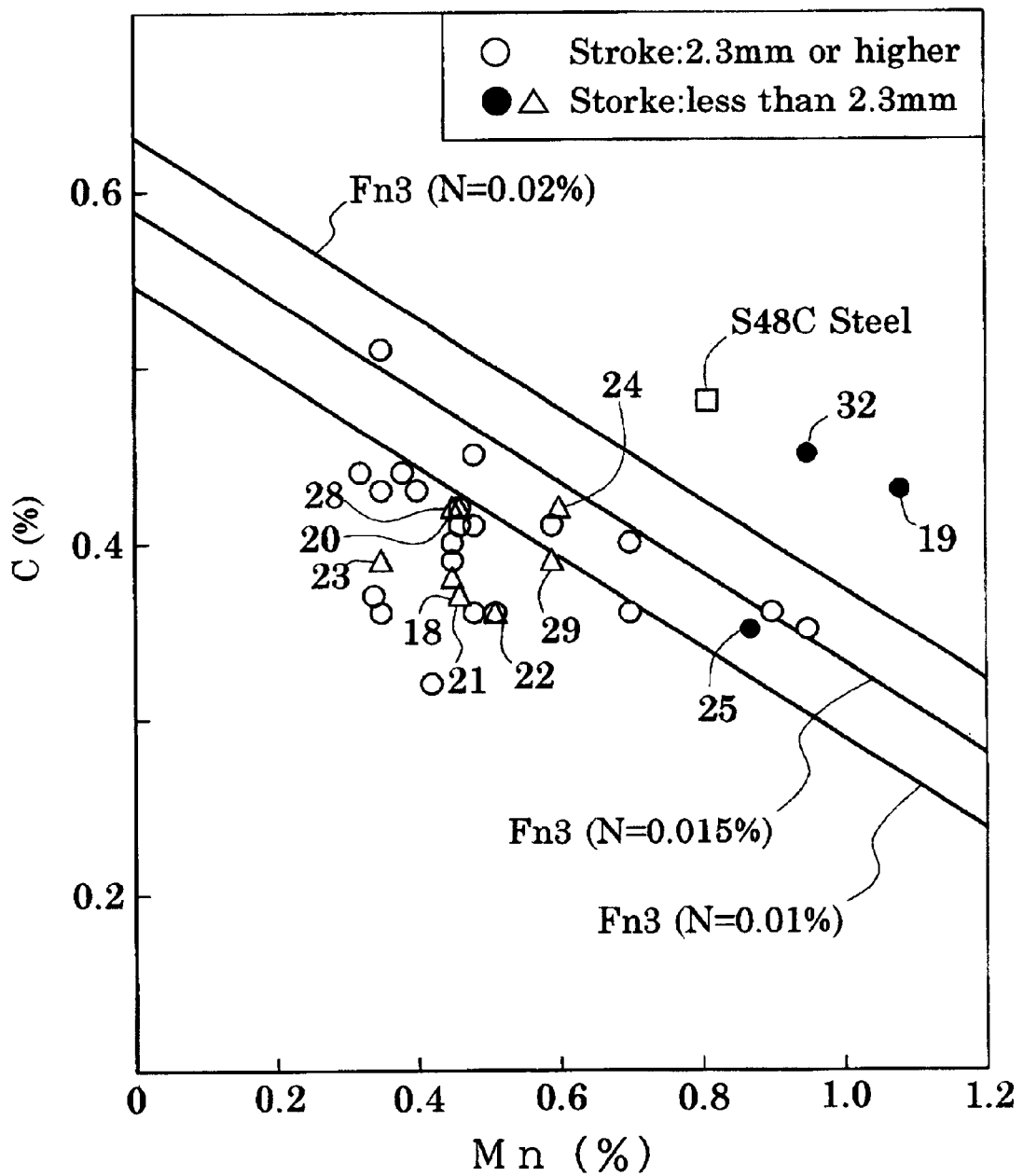

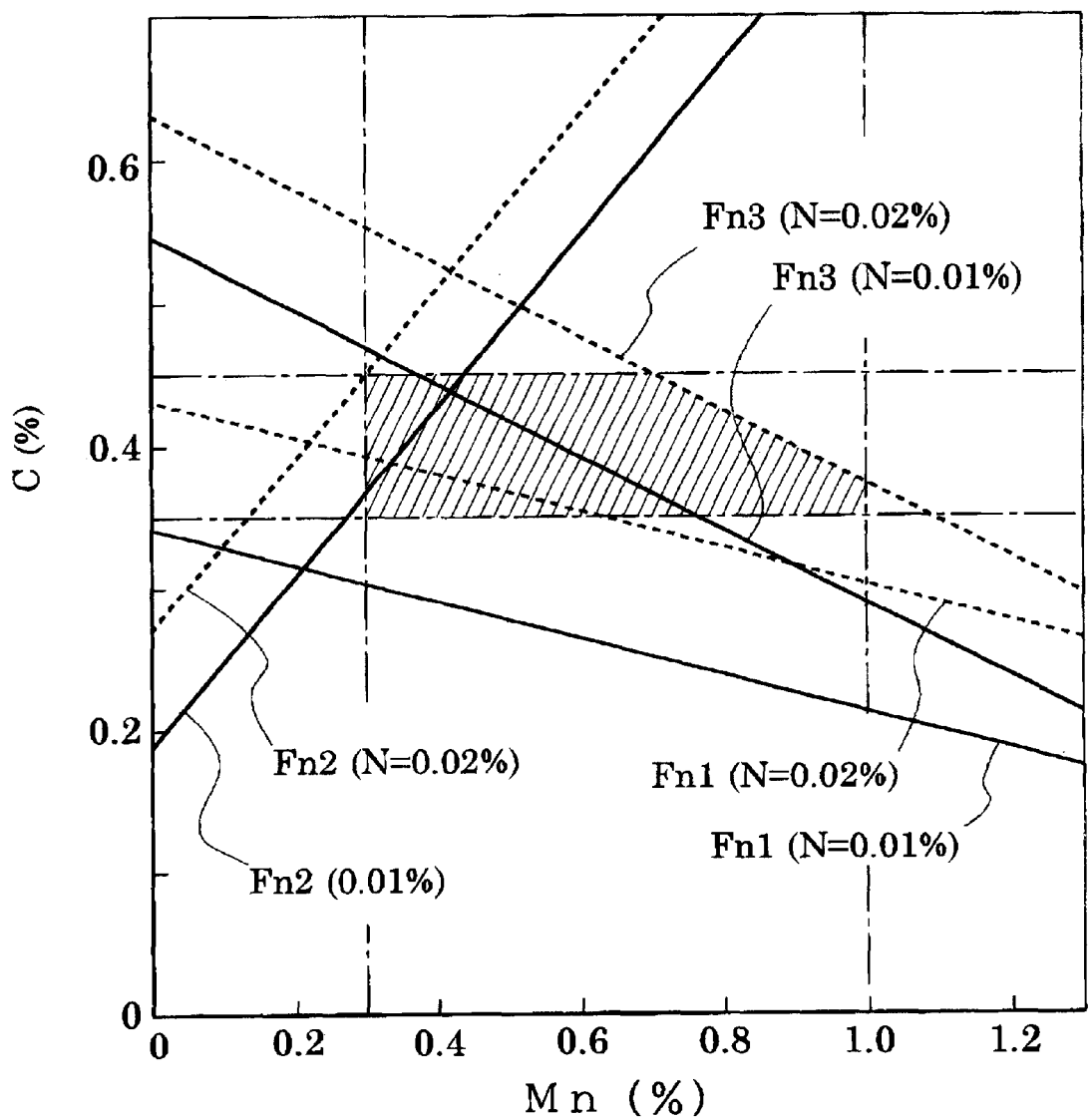
[Fig.9]

NON-HEAT TREATED, SOFT-NITRIDED STEEL PARTS

FIELD OF THE INVENTION

The present invention relates to a soft-nitrided steel part having high fatigue strength, excellent bending properties and excellent wear resistance, even if subjecting to soft-nitriding without quenching-tempering or normalizing after hot working.

BACKGROUND OF THE INVENTION

Generally, shaft parts for automobiles, industrial machinery, construction machinery and the like are produced by the following process, in order to achieve their desired strength.

After forming billets of alloy steels or carbon steels for machine structural use into a desired shape through hot forging, machining and the like, the shaped workpiece is subjected to (a) a heat treatment (e.g. induction quenching-and-tempering), or (b) further subjected to soft-nitriding after the said heat treatment. The soft-nitriding can further improve fatigue strength of the steel parts after heat treatment.

In late years, for cost saving, various processes, i.e., so-called "non-heat treatment soft-nitriding process" or "non-normalizing soft-nitriding process", which intend to eliminate quenching-tempering or normalizing before soft-nitriding, have been discussed. However, when alloy steels or carbon steels for machine structural use defined by JIS (Japanese Industrial Standards) are used for materials, eliminating quenching-tempering or normalizing before soft-nitriding allows a coarsened grain structure or a mixed grain structure during hot working to be retained in a final product. These structures deteriorate fatigue strength and bending properties of the final product. In high-speed rotating shafts, such as a crankshaft, wear at sliding portions thereof can give rise to oil leak or sticking.

Some approaches have been suggested to steel parts manufactured without quenching-tempering or normalizing before soft-nitriding, and manufacturing methods thereof, as described below.

(1) A steel for nitriding, including C, Si, Mn, P, S, Cr, sol. Al, Ti, Ca, Pb and N, and being capable of having performances equal or superior to a heat treated steel in fatigue strength and crack length risen out of bending correction, even if subjecting to nitriding without heat treatment, and a manufacturing method thereof (cf. Publication of Unexamined Japanese Patent Application No. 9-3601).

(2) A steel for nitriding, including C, Si, Mn, P, S, sol. Al, Ti, Ca, Pb and N, and being capable of having performances equal or superior to a heat treated steel in notch fatigue strength and crack length risen out of bending correction, even if controlling to reduce each content of Cr and V in impurities and subjecting to nitriding without heat treatment, and a manufacturing method for a nitrided steel product using said steel for nitriding as a raw material (cf. Publication of Unexamined Japanese Patent Application No. 10-46287).

(3) A crankshaft including C, Si, Mn, Ti, Al, N, S and Ca as well as optionally Pb, and being produced with controlling to reduce each content of P and V in impurities and subjecting to nitriding without heat treatment, and a manufacturing method thereof (cf. Publication of Unexamined Japanese Patent Application No.11-62943).

(4) A nitriding steel having a substantial ferrite-pearlite structure, 30% or more of ferrite area ratio, a grain size defined by five or over of ferrite grain size number, and 50 μm or less of average size of pearlite, in the state just after subjecting a steel defined by C, Si, Mn, Cr, Ni, Mo, N, V, Nb, Ti, Zr, Ta, S, Pb, Ca, Bi and Te to hot working (cf. Publication of Unexamined Japanese Patent Application No. 9-291339).

(5) A soft-nitridied workpiece having a ferrite-pearlite structure defined by 50 μm or less of average size of ferrite crystal grain and 50 μm or less of average size of pearlite crystal grain, in the state just after subjecting a steel defined by C, Si, Mn, Cr, Ni, Mo, N, V, Nb, Ti, Zr, Ta, S, Pb, Ca, Bi and Te to hot forging (cf. Publication of Unexamined Japanese Patent Application No.9-324258).

Properties of wear, fatigue, and bending, required by soft-nitrided parts have an antithetical relationship to each other. Thus, in the case of eliminating quenching-tempering or normalizing, it is generally difficult to maintain all of the properties at respective desired levels. However, in all inventions of steels for nitriding steel or nitrided parts described in the above (1) to (5), the variance of wear properties has not been considered.

SUMMARY OF THE INVENTION

It is an object of the present invention to provide a non-heat treated soft-nitrided steel part having high fatigue strength, excellent bending properties, and excellent wear resistance, even if it is subjected to soft-nitriding with neither quenching-tempering nor normalizing, i.e., without prior heat treatment after hot working (hereafter this process is referred to as "non-heat treatment soft-nitriding").

More specifically, it is an object of the present invention to provide a non-heat treated soft-nitrided steel part in which all of fatigue strength, bending properties and wear resistance are equal or superior to those of a steel part that is made of JIS-S48C (one of the machine structural use carbon steels) through soft-nitriding with subjecting to normalizing after hot working.

As a result of various studies for solving the foregoing problems, the present inventors have obtained the following knowledge.

(1) When a steel defined by a specific chemical composition is subjected to non-heat treatment soft-nitriding, the resulting wear resistance of the steel correlates with the following formula Fn1.

$$Fn1=-141.5(C\%)-19.6(Mn\%)+1280(N\%)+95.6$$

In order to achieve the wear resistance equal or superior to that of a steel part for which a steel of JIS-S48C is selected as a raw material and which has been subjected to soft-nitriding after normalizing, 60 or less of Fn1 value is required.

(2) When a steel defined by a specific chemical composition is subjected to non-heat treatment soft-nitriding, the resulting fatigue strength of the steel correlates with the following formula Fn2.

$$Fn2=-103.8(C\%)+59.1(Mn\%)+850.4(N\%)+360.9$$

In order to achieve the fatigue strength equal or superior to that of a steel part for which a steel of JIS-S48C is selected as a raw material and which has been subjected to soft-nitriding after normalizing, 350 or more of Fn2 value is required.

(3) When a steel defined by a specific chemical composition is subjected to non-heat treatment soft-nitriding, the resulting bending properties of the steel correlates with the following formula Fn3.

$$Fn3=-13.4(C\%)-3.45(Mn\%)+112.7(N\%)+13.2$$

In order to achieve the bending properties equal or superior to that of a steel part for which a steel of JIS-S48C is selected as a raw material and which has been subjected to soft-nitriding after normalizing, 7 or more of Fn3 value is required.

The present invention has been accomplished in accordance with the aforementioned knowledge, and a subject matter of the present invention is the following non-heat treated soft-nitrided steel part. A non-heat treated soft-nitrided steel part manufactured from a steel that contains, by mass %, 0.35 to 0.45% of C, 0.05 to 1.00% of Si, 0.3 to 1.0% of Mn, 0.03% or less of P, 0.15% or less of Cr, 0.001 to 0.03% of Ti, 0.03% or less of V, 0.010 to 0.020% of N, 0.08% or less of Al, 0.05 to 0.30% of Pb, 0.10% or less of S, and 0.003% or less of Ca, and satisfies the following formulas (1) to (3), with the remainder being Fe and incidental impurities, said steel part being subjected to soft-nitriding.

$$Fn1=-141.5(C\%)-19.6(Mn\%)+1280(N\%)+95.6 \leq 60 \quad (1)$$

$$Fn2=-103.8(C\%)+59.1(Mn\%)+850.4(N\%)+360.9 \geq 350 \quad (2)$$

$$Fn3=-13.4(C\%)-3.45(Mn\%)+112.7(N\%)+13.2 \geq 7 \quad (3)$$

BRIEF DESCRIPTION OF THE DRAWINGS

FIG. 1 is a top plan view showing a substantial part of a test piece used in a fatigue test and bending test.

FIG. 2 is a top plan view and longitudinal cross-sectional view showing a test piece used in a wear test.

FIG. 3 is a diagram showing a wear test result, which is arranged with regard to formula Fn1.

FIG. 4 is a diagram showing a fatigue test result, which is arranged with regard to formula Fn2.

FIG. 5 is a diagram showing a bending test result, which is arranged with regard to formula Fn3.

FIG. 6 is a diagram showing a relationship between wear amount and Mn content.

FIG. 7 is a diagram showing a relationship between fatigue strength and Mn content.

FIG. 8 is a diagram showing a relationship between bending properties and Mn content FIG. 9 is a diagram showing the range of the present invention defined by the relationship between contents of C, Mn and N, and formulas of Fn1, Fn2 and Fn3.

DESCRIPTION OF THE PREFERRED EMBODIMENT

The chemical composition of the non-heat treated soft-nitrided steel part of the present invention has been determined in accordance with the following reasons.

Note that the unit "%" concerning each content of components intends to "mass %".

C: 0.35 to 0.45%

Carbon (C) is an effective element for yielding wear resistance to a non-heat treated soft-nitrided steel part. Thus, it is required to be contained at least 0.35% or more, preferably 0.40% or more. However, more than 0.45% of C content causes deterioration in fatigue strength. In addition, a crack can be occurred when a bending due to a distortion after soft-nitriding is corrected. Therefore, the C content has been determined in the range of 0.35 to 0.45%.

Si: 0.05 to 1.00%

Silicon (Si) is an effective element for deoxidation of steel and for enhancing fatigue strength. However, such effects cannot be obtained when its content is less than 0.05%. On the other hand, more than 1.0% of the content causes deterioration in bending properties. Therefore, the Si content has been determined in the range of 0.05 to 1.00%.

Mn: 0.3 to 1.0%

Manganese (Mn) is an effective element for deoxidization of steel and for enhancing hardenability as well as for improving soft-nitriding properties to enhance fatigue strength. However, such effects cannot be expected when its content is less than 0.3%. On the other hand, more than 1.0% of the content causes deterioration in bending properties, resulting in occurrence of a crack when a bending due to a distortion after soft-nitriding is corrected. Therefore, the Mn content has been determined in the range of 0.3 to 1.0%.

P: 0.03% or less

Phosphorus (P) is an element existing as an impurity, which causes deterioration in bending properties. Thus, it is desirable to limit P content as little as possible. Therefore, the P content has been determined in 0.03% or less in consideration of the difficulty of thorough refining.

Cr: 0.15% or less

Chromium (Cr) is an element existing as an impurity, which is included in steel during refining process thereof. It is desirable to limit Cr content as little as possible because Cr creates a hard nitride through soft-nitriding to cause deterioration in bending properties. However, since 0.15 or less of the content has a negligible impact, the allowable upper limit of the Cr content has been determined to 0.15% in consideration of the difficulty of thorough refining.

Ti: 0.001 to 0.03%

Titanium (Ti) is an effective element for yielding grain refining to enhance fatigue strength. However, such effects cannot be obtained when its content is less than 0.001%. On the other hand, more than 0.03% of the content causes deterioration in bending properties, resulting in occurrence of a crack when a bending due to a distortion after soft-nitriding is corrected. Therefore, the Ti content has been determined in the range of 0.001 to 0.03%.

V: 0.03% or less

Vanadium (V) is an element which increases surface hardness after nitriding to cause deterioration in bending properties. Thus, it is desirable to limit V content as little as possible. However, since V is mixed in steel as impurity, the allowable upper limit of the V content has been determined in 0.03% in consideration of the difficulty of thorough refining. V of 0.03% or less has a negligible impact on the above properties.

N: 0.010 to 0.020%

Nitrogen (N) is an effective element for improving fatigue strength and bending properties. However, such effects cannot be obtained by less than 0.010% of the N content, while more than 0.020% of the content results in saturation of such effects. Therefore, the N content has been determined in the range of 0.010 to 0.020%.

Al: 0.08% or less

Aluminum (Al) may be applied as deoxidizing agent for steel. However, in the steel of the present invention, it is not essential to add Al because Si and Mn (or additionally Ca) can contribute to achieve such deoxidation effect. Particularly, large quantity of Al makes increased oxide inclusion and thereby causes deterioration in bending properties of steel. Therefore, the Al content has been determined in 0.08% or less.

S: 0.10% or less

Sulfur (S) may not be contained because S causes deterioration in hot workability and strength of steel. On the other hand, S may be positively contained to improve machinability. However, more than 0.10% of the S content causes considerable deterioration in fatigue strength. Therefore, the S content has been determined to be 0.10% or less. In order to achieve a sufficient effect in machinability, it is desirable to include 0.005% or more S.

Ca: 0.003 or less

Calcium (Ca) may be omitted because it causes deterioration in fatigue strength and bending properties of steel. On the other hand, Ca may be positively contained to improve machinability. However, more than 0.003% of the content causes considerable deterioration in fatigue strength. Therefore, the Ca content has been determined to be 0.003% or less. In order to achieve a sufficient effect in machinability, it is desirable to include 0.0003% or more Ca.

Pb: 0.05 to 0.30%

0.05% or more of lead (Pb) is contained to improve machinability of steel. However, more than 0.30% of the content makes increased inclusion, and thereby causes deterioration in fatigue strength and bending properties. Therefore, the Pb content has been determined in the range of 0.05 to 0.30%.

By the regression analysis of the test results, as shown in after-mentioned examples, concerning wear test, fatigue test and bending test of the steels after non-heat treatment soft-nitriding, it was found that there is a significant difference depending on each content of C, Mn and N, and the following formulas (a), (b) and (c) have been conclusively obtained.

$$Fn1=-141.5(C\%)-19.6(Mn\%)+1280(N\%)+95.6 \quad (a)$$

$$Fn2=-103.8(C\%)+59.1(Mn\%)+850.4(N\%)+360.9 \quad (b)$$

$$Fn3=-13.4(C\%)-3.45(Mn\%)+112.7(N\%)+13.2 \quad (c)$$

FIGS. 3, 4 and 5 are diagrams showing relationships between wear amount and formula Fn1 (FIG. 3), between fatigue strength and formula Fn2 (FIG. 4), and between cracking stroke and the formula Fn3 (FIG. 5) of the steel after non-heat treatment soft-nitriding. In each figure mark ○ indicates data of the steels of the present invention, while mark Δ indicates data of the comparative example. Mark ● indicates data of JIS-S48C steel subjected to soft-nitriding after normalizing.

As apparent in FIG. 3, in order to achieve the wear resistance equal to that of the JIS-S48C steel subjected to soft-nitriding after normalizing, the steel prepared in the chemical composition according to the present invention is required to satisfy the following formula (1).

$$Fn1=-141.5(C\%)-19.6(Mn\%)+1280(N\%)+95.6 \leq 60 \quad (1)$$

As apparent in FIG. 4, in order to achieve the fatigue properties equal to that of the JIS-S48C steel subjected to soft-nitriding after normalizing, the steel prepared in the chemical composition according to the present invention is required to satisfy the following formula (2).

$$Fn2=-103.8(C\%)+59.1(Mn\%)+850.4(N\%)+360.9 \geq 350 \quad (2)$$

As apparent in FIG. 5, in order to achieve the bending properties equal to that of the JIS-S48C steel subjected to soft-nitriding after normalizing, the steel prepared in the chemical composition according to the present invention is required to satisfy the following formula (3).

$$Fn3=-13.4(C\%)-3.45(Mn\%)+112.7(N\%)+13.2 \geq 7 \quad (3)$$

Further, the data on wear amount, fatigue strength, and bending properties by which FIGS. 3, 4, and 5 were determined have been investigated in relation to each content of C, Mn and N.

FIGS. 6, 7, and 8 are diagrams showing relationships between wear amount (FIG. 6), fatigue strength (FIG. 7) and bending properties (FIG. 8), and contents of C, Mn and N, respectively. The N content is shown by straight lines which are determined by substituting 0.01%, 0.015% and 0.02% of N contents respectively into the aforementioned formulas (1) to (3). In FIG. 6, the mark ● or Δ means that each property is inferior to that resulting from the S48C steel, while the mark ○ means that each property is superior to that resulting from the S48C steel. The mark ● also means that values of at least one of the formulas Fn1, Fn2 and Fn3 is out of the range according to the present invention. The mark Δ also means that all of the values of formulas Fn1, Fn2 and Fn3 are in the range according to the present, but at least one of the respective content of elements is out of the range according to the present invention.

FIG. 9 is a diagram showing the range of the present invention defined by the relationship between contents of C, Mn and N, and formulas of Fn1, Fn2 and Fn3. The straight lines in FIGS. 6, 7 and 8, which are determined by substituting 0.01% and 0.02% of N contents respectively into the formulas Fn1, Fn2 and Fn3, are put together into FIG. 9. The shaded portion in FIG. 9 shows the range according to the present invention.

A manufacturing method of a non-heat treated soft-nitrided steel part of the present invention will be described hereafter.

A raw material having the aforementioned composition (a steel of the present invention) is heated and forged into a workpiece having a desired shape. In this step, the heating temperature is desirable to be arranged as low as possible. However, since large press capacity is required for forging at low temperature, 1200° C. of heating temperature is normally selected as a general requirement, and the actual heating temperature may be determined in the range of 1100 to 1250° C. depending on an available press capacity. After forging, natural cooling (air cooling) is applied in view of manufacturing cost. Otherwise, forced-air cooling may also be applied for shortening production time without any difficulty.

After adjusting into the desired shape, the workpiece is subjected to soft-nitriding without any pre heat treatment, such as normalizing or quenching-and-tempering. The soft-nitriding is performed in the atmosphere, which is set in the range of 0.8 to 1.2 of the ratio of the RX gas (trade mark) to ammonia, at 570 to 600° C. for 60 to 120 minutes. After this step, the workpiece is directly oil-cooled. According to the aforementioned gas composition ratio of atmosphere, temperature and time, a suitable compound layer and a sufficient depth of diffusion layer for improving sticking resistance can be obtained. It should be understood that a suitable after treatment, such as bending correction, may be performed after the soft-nitriding.

EXAMPLE

Steels having chemical compositions shown in Table 1 and Table 2 were prepared with a 150 kg melting furnace.

The number 1 to 15 steels in Table 1 are examples of the present invention prepared in the range of chemical composition according to the present invention. The number 16 to 32 steels in Table 2 are comparative examples in which the chemical composition or at least one of the values of formulas Fn1 to Fn3 is out of the range according to the present invention. The number 33 steel in Table 2 is the conventional JIS-S480 steel, which has heretofore been widely used for crankshafts.

As for fatigue properties, bending fatigue strength (stressed at notched portion) was determined using the "Ono-type rotating-bending fatigue tester" at 3000 min$^{-1}$ of rotating speed. The stress at the bottom of the notch was measured as fatigue strength and determined by attaching a strain gauge onto the notch bottom.

As for bending properties, a three-point bending test was carried out in which a crack gauge (strain gauge) was attached onto the notch bottom of the wear test piece, a

TABLE 1

| Steel | | Chemical Composition (balance: Fe, mass %) | | | | | | | | | | | | | |
|---|---|---|---|---|---|---|---|---|---|---|---|---|---|---|---|
| | No. | C | Si | Mn | P | Cr | Ti | V | Al | N | S | Ca | Pb | Fn1 | Fn2 | Fn3 |
| Steels | 1 | 0.40 | 0.15 | 0.45 | 0.020 | 0.07 | 0.001 | 0.01 | 0.003 | 0.0177 | — | — | 0.07 | 52.8 | 361.0 | 8.3 |
| of this | 2 | 0.37 | 0.35 | 0.34 | 0.024 | 0.14 | 0.020 | 0.02 | 0.025 | 0.0182 | — | — | 0.05 | 59.9 | 358.1 | 9.1 |
| Inven- | 3 | 0.43 | 0.50 | 0.40 | 0.018 | 0.03 | 0.029 | 0.01 | 0.034 | 0.0152 | — | — | 0.12 | 51.2 | 392.8 | 7.8 |
| tion | 4 | 0.36 | 0.42 | 0.90 | 0.028 | 0.08 | 0.024 | 0.02 | 0.021 | 0.0189 | — | — | 0.12 | 51.2 | 392.8 | 7.4 |
| | 5 | 0.35 | 0.68 | 0.95 | 0.015 | 0.06 | 0.012 | 0.03 | 0.008 | 0.0195 | — | — | 0.18 | 52.4 | 397.3 | 7.4 |
| | 6 | 0.41 | 0.87 | 0.46 | 0.013 | 0.08 | 0.010 | 0.02 | 0.041 | 0.0160 | — | — | 0.25 | 49.0 | 359.1 | 7.9 |
| | 7 | 0.42 | 0.05 | 0.46 | 0.008 | 0.07 | 0.012 | 0.02 | 0.032 | 0.0142 | — | — | 0.18 | 45.3 | 356.6 | 7.6 |
| | 8 | 0.36 | 0.15 | 0.51 | 0.021 | 0.13 | 0.007 | 0.03 | 0.028 | 0.0152 | — | — | 0.09 | 54.1 | 366.6 | 8.3 |
| | 9 | 0.43 | 0.21 | 0.35 | 0.023 | 0.11 | 0.002 | 0.01 | 0.056 | 0.0180 | — | — | 0.06 | 50.9 | 352.3 | 8.3 |
| | 10 | 0.36 | 0.25 | 0.70 | 0.021 | 0.15 | 0.015 | 0.01 | 0.067 | 0.0121 | 0.006 | — | 0.06 | 46.4 | 375.2 | 7.3 |
| | 11 | 0.44 | 0.98 | 0.38 | 0.016 | 0.06 | 0.018 | 0.02 | 0.002 | 0.0195 | 0.051 | 0.0030 | 0.09 | 50.9 | 354.3 | 8.2 |
| | 12 | 0.40 | 0.21 | 0.70 | 0.014 | 0.04 | 0.022 | 0.01 | 0.025 | 0.0172 | 0.095 | — | 0.12 | 47.3 | 375.4 | 7.4 |
| | 13 | 0.41 | 0.18 | 0.48 | 0.028 | 0.02 | 0.015 | 0.01 | 0.006 | 0.0162 | 0.024 | 0.0025 | 0.15 | 48.9 | 360.5 | 7.9 |
| | 14 | 0.39 | 0.41 | 0.45 | 0.024 | 0.01 | 0.021 | 0.02 | 0.038 | 0.0112 | 0.024 | — | 0.29 | 45.9 | 356.5 | 7.7 |
| | 15 | 0.41 | 0.05 | 0.59 | 0.017 | 0.08 | 0.014 | 0.01 | 0.005 | 0.0142 | 0.045 | 0.0015 | 0.08 | 44.2 | 365.3 | 7.3 |

TABLE 2

| Steel | | Chemical Composition (balance: Fe, mass %) | | | | | | | | | | | | | |
|---|---|---|---|---|---|---|---|---|---|---|---|---|---|---|---|
| | No. | C | Si | Mn | P | Cr | Ti | V | Al | N | S | Ca | Pb | Fn1 | Fn2 | Fn3 |
| Compar- | 16 | 0.32 | 0.35 | 0.42 | 0.024 | 0.14 | 0.020 | 0.02 | 0.025 | 0.0185 | — | — | 0.09 | 65.8 | 368.2 | 9.5 |
| ative | 17 | 0.51 | 0.68 | 0.35 | 0.015 | 0.06 | 0.012 | 0.03 | 0.008 | 0.0195 | — | — | 0.06 | 41.5 | 345.2 | 7.4 |
| Steels | 18 | 0.38 | 1.05 | 0.45 | 0.024 | 0.01 | 0.021 | 0.02 | 0.038 | 0.0112 | — | — | 0.06 | 47.3 | 357.6 | 7.8 |
| | 19 | 0.43 | 0.15 | 1.08 | 0.017 | 0.08 | 0.014 | 0.01 | 0.005 | 0.0198 | — | — | 0.09 | 38.9 | 396.9 | 5.9 |
| | 20 | 0.42 | 0.35 | 0.46 | 0.038 | 0.01 | 0.021 | 0.02 | 0.038 | 0.0112 | — | — | 0.12 | 41.5 | 354.0 | 7.2 |
| | 21 | 0.37 | 0.50 | 0.46 | 0.023 | 0.18 | 0.014 | 0.01 | 0.005 | 0.0142 | — | — | 0.15 | 52.4 | 361.8 | 8.3 |
| | 22 | 0.36 | 0.42 | 0.51 | 0.021 | 0.03 | 0.038 | 0.03 | 0.028 | 0.0152 | — | — | 0.29 | 54.1 | 366.6 | 8.3 |
| | 23 | 0.39 | 0.68 | 0.35 | 0.016 | 0.08 | 0.018 | 0.05 | 0.025 | 0.0127 | — | — | 0.12 | 49.8 | 351.9 | 8.2 |
| | 24 | 0.42 | 0.87 | 0.60 | 0.014 | 0.06 | 0.022 | 0.01 | 0.095 | 0.0158 | — | — | 0.18 | 44.6 | 366.2 | 7.3 |
| | 25 | 0.35 | 0.05 | 0.87 | 0.028 | 0.08 | 0.015 | 0.02 | 0.009 | 0.0082 | — | — | 0.25 | 39.5 | 383.0 | 6.4 |
| | 26 | 0.36 | 0.15 | 0.48 | 0.024 | 0.07 | 0.021 | 0.01 | 0.023 | 0.0227 | — | — | 0.18 | 64.3 | 371.2 | 9.3 |
| | 27 | 0.45 | 0.21 | 0.48 | 0.017 | 0.13 | 0.014 | 0.02 | 0.035 | 0.0150 | 0.125 | — | 0.08 | 41.7 | 355.3 | 7.2 |
| | 28 | 0.42 | 0.25 | 0.45 | 0.024 | 0.11 | 0.020 | 0.03 | 0.006 | 0.0142 | — | 0.0038 | 0.07 | 45.5 | 356.0 | 7.6 |
| | 29 | 0.39 | 0.98 | 0.59 | 0.015 | 0.15 | 0.021 | 0.02 | 0.015 | 0.0138 | — | — | 0.32 | 46.5 | 367.0 | 7.5 |
| | 30 | 0.36 | 0.21 | 0.35 | 0.015 | 0.06 | 0.021 | 0.03 | 0.024 | 0.0198 | — | — | 0.07 | 63.1 | 361.1 | 9.4 |
| | 31 | 0.44 | 0.09 | 0.32 | 0.021 | 0.13 | 0.007 | 0.03 | 0.028 | 0.0103 | — | — | 0.05 | 40.3 | 342.9 | 7.4 |
| | 32 | 0.45 | 0.07 | 0.95 | 0.023 | 0.11 | 0.002 | 0.01 | 0.056 | 0.0105 | — | — | 0.08 | 26.7 | 379.3 | 5.1 |
| Conven- | 33 | 0.48 | 0.25 | 0.81 | 0.025 | 0.08 | — | — | 0.025 | 0.0080 | — | — | — | 22.0 | 365.8 | 4.9 |
| tional | | | | | | | | | | | | | | | | |
| Steel | | | | | | | | | | | | | | | | |

Billets of the steels were heated up to 1250° C. and hot-forged in the temperature range of 1250 to 1100° C. into round bars of 50 mm in diameter, followed by air cooling. The number 33 steel was subjected to normalizing wherein the steel was maintained at 850° C. for 1 hour.

A fatigue test piece and wear test piece shown in FIG. 1 and FIG. 2 were cut out of the round bars. The obtained test pieces were subjected to soft-nitriding where the test pieces were maintained in the atmosphere having 1:1 of the mixing ratio of the RX gas (trade mark) to ammonia, at 570° C. for 2 hours. Then, the soft-nitrided test pieces were oil-cooled.

supporting span being set in 50 mm. Stress was applied on the other side of the crack gauge with 20 mm/min crosshead speed of the tester. Then, the bending properties was estimated by cracking stroke that is the stroke of the crosshead when a crack was occurred in the test piece.

The wear test was carried out using a pin-on-disk type wear tester.

FIG. 2 is a top plan view and longitudinal sectional view showing a disk-shaped test piece composed of the test steel.

In the wear tester, a fluorine-contained rubber pin was pressed onto a flat surface of the disk-shaped test piece shown in FIG. 2, and the test piece was rotated at 1000 min$^{-1}$ within an oil including an abrasive. After the test piece had been rotated for 100 hours, a hollowed amount was determined as the wear amount, using a surface roughness tester.

These test results are collectively shown in Table 3.

TABLE 3

| | Tests Results | | |
|---|---|---|---|
| Steel No. | Wear Amount ($\mu$m) | Fatigue Strength (MPa) | Cracking Stroke (mm) |
| Steels of this Invention | | | |
| 1 | 140 | 509.0 | 2.8 |
| 2 | 179 | 504.9 | 3.0 |
| 3 | 108 | 497.5 | 2.6 |
| 4 | 131 | 553.8 | 2.5 |
| 5 | 137 | 560.2 | 2.5 |
| 6 | 120 | 506.4 | 2.6 |
| 7 | 103 | 502.8 | 2.5 |
| 8 | 146 | 516.9 | 2.8 |
| 9 | 130 | 496.7 | 2.8 |
| 10 | 108 | 529.0 | 2.4 |
| 11 | 129 | 499.5 | 2.7 |
| 12 | 112 | 529.3 | 2.5 |
| 13 | 120 | 508.3 | 2.6 |
| 14 | 105 | 502.7 | 2.6 |
| 15 | 98 | 515.1 | 2.4 |
| Comparative Steels | | | |
| 16 | 216 | 519.2 | 3.2 |
| 17 | 86 | 486.8 | 2.5 |
| 18 | 112 | 504.2 | 1.5 |
| 19 | 76 | 559.7 | 2.0 |
| 20 | 86 | 499.2 | 1.8 |
| 21 | 137 | 510.1 | 1.5 |
| 22 | 146 | 516.9 | 1.3 |
| 23 | 124 | 496.2 | 0.9 |
| 24 | 100 | 516.3 | 1.1 |
| 25 | 78 | 540.0 | 1.7 |
| 26 | 207 | 523.4 | 3.1 |
| 27 | 87 | 482.3 | 2.4 |
| 28 | 104 | 468.2 | 1.6 |
| 29 | 108 | 411.5 | 1.3 |
| 30 | 199 | 509.1 | 3.1 |
| 31 | 81 | 483.5 | 2.5 |
| 32 | 36 | 534.8 | 1.7 |
| Conventional Steel | | | |
| 33 | 180 | 495.0 | 2.3 |

The number 1 to 15 steels having the chemical composition in the range according to the present invention could achieve the wear resistance, fatigue strength, and bending properties (cracking stroke) equal or superior to those of the number 33 conventional JIS-S48C steel, which was soft-nitrided after normalizing.

In contrast, the number 16 comparative steel showed 216 $\mu$m wear amount, which is larger than that of the number 33 conventional steel, because the number 16 steel has low C content of 0.32% and high Fn1 value of 65.8.

The number 17 steel has high C content of 0.51% and low Fn2 value of 345.2. Thus, this steel has fatigue strength of 486.8 MPa lower than that of the number 33 conventional steel.

The number 18 steel has high Si content of 1.05%, resulting in the cracking stroke of 1.5 mm. Thus, this steel is inferior in the bending properties.

The number 19 steel has high Mn content of 1.08% and low Fn3 value of 5.7, resulting in the cracking stroke of 2.0 mm. Thus, this steel is inferior in the bending properties.

The number 20 steel has high P content of 0.038%, resulting in the cracking stroke of 1.8 mm. Thus, this steel is inferior in the bending properties.

The number 21 steel has high Cr content of 0.18%, resulting in the cracking stroke of 1.5 mm. Thus, this steel is inferior in the bending properties.

The number 22 steel has high Ti content of 0.038%, resulting in the cracking stroke of 1.3 mm. Thus, this steel is inferior in the bending properties.

The number 23 steel has high V content of 0.05%, resulting in the cracking stroke of 0.9 mm. Thus, this steel is inferior in the bending properties.

The number 24 steel has high Al content of 0.095%, resulting in the cracking stroke of 1.1 mm. Thus, this steel is inferior in the bending properties.

The number 25 steel has low N content of 0.0082% and low Fn3 value of 6.4, resulting in the cracking stroke of 1.7 mm. Thus, this steel is inferior in the bending properties.

The number 26 steel has high N content of 0.0227% and high Fn1 value of 64.3. Thus, this steel has larger wear amount of 207 $\mu$m than that of the number 33 conventional steel.

The number 27 steel has high S content of 0.125%, resulting in low fatigue strength of 482.3 MPa.

The number 28 steel has high Ca content of 0.0038%, resulting in low fatigue strength of 468.2 MPa, and the cracking stroke of 1.6 mm. Thus, this steel is inferior in the bending properties.

The number 29 steel has high Pb content of 0.32%, resulting in low fatigue strength of 411.5 MPa, and the cracking stroke of 1.3 mm. Thus, this steel is inferior in the bending properties.

The number 30 steel has high Fn1 value of 63.1, resulting in large wear amount of 199 $\mu$m.

The number 31 steel has low Fn2 value of 342.9, resulting in low fatigue strength of 483.5 MPa.

The number 32 steel has low Fn3 value of 5.1, resulting in cracking stroke of 1.7 mm. Thus, this steel is inferior in the bending properties.

The soft-nitrided steel part of the present invention is characterized by defining respective contents of C, Si, Mn, P, Cr, Ti, V, N, Al, Pb, S and Ca, and further by defining respective calculated values from each content of C, Mn and N (i.e., values determined by the formulas Fn1 to Fn3 described above). Therefore, the steel part of the present invention has fatigue strength, bending properties and wear resistance, which are equal or superior to those of the JIS-S48C steel soft-nitrided after normalizing, even if subjected to soft-nitriding without quenching-tempering or normalizing. These resulting parts can be used as crankshafts for automobiles, industrial machinery, construction machinery and the like. According to the present invention, soft-nitriding can be performed without any prior heat treatment. This invention can contribute to save manufacturing cost of such parts, and has significant industrial advantage.

What is claimed is:

1. A non-heat treated soft-nitrided steel part manufactured from a steel characterized by containing, by mass %, 0.35 to 0.45% of C,
0.05 to 1.00% of Si,
0.3 to 1.0% of Mn,
0.03% or less of P,
0.15% or less of Cr,
0.001 to 0.03% of Ti, 0.03% or less of V,
0.010 to 0.020% of N,
0.08% or less of Al,
0.05 to 0.30% of Pb,
0.10% or less of S,
0.003% or less Ca, the balance being Fe and incidental impurities;
and further characterized by satisfying the following formulas (1) to (3):

$$Fn1 = -141.5(C\%) - 19.6(Mn\%) + 1280(N\%) + 95.6 \leq 60 \quad (1)$$

$$Fn2 = -103.8(C\%) + 59.1(Mn\%) + 850.4(N\%) + 360.9 \geq 350 \quad (2)$$

$$Fn3 = -13.4(C\%) - 3.45(Mn\%) + 112.7(N\%) + 13.2 \geq 7 \quad (3).$$

2. A non-heat treated soft-nitrided steel part according to claim 1, characterized in that the steel contains 0.40 to 0.45 mass % of C, and at least one of 0.005 to 0.10 mass % of S and 0.0003 to 0.003 mass % Ca.

3. A non-heat treated soft-nitrided crankshaft for automobiles manufactured from a steel characterized by containing, by mass %, 0.35 to 0.45% of C,
0.05 to 1.00% of Si,
0.3 to 1.0% of Mn,
0.03% or less of P,
0.15% or less of Cr,
0.001 to 0.03% of Ti,
0.03% or less of V,
0.010 to 0.020% of N,
0.08% or less of Al,
0.05 to 0.30% of Pb,
0.10% or less of S,
0.003% or less Ca, the balance being Fe and incidental impurities;
and further characterized by satisfying the following formulas (1) to (3):

$$Fn1 = -141.5(C\%) - 19.6(Mn\%) + 1280(N\%) + 95.6 \leq 60 \quad (1)$$

$$Fn2 = -103.8(C\%) + 59.1(Mn\%) + 850.4(N\%) + 360.9 \geq 350 \quad (2)$$

$$Fn3 = -13.4(C\%) - 3.45(Mn\%) + 112.7(N\%) + 13.2 \geq 7 \quad (3).$$

4. A non-heat treated soft-nitrided crankshaft for automobiles according to claim 3, characterized in that the steel contains 0.40 to 0.45 mass % of C, and at least one of 0.005 to 0.10 mass % of S and 0.0003 to 0.003 mass % of Ca.

* * * * *